United States Patent
Baret et al.

(10) Patent No.: US 10,698,389 B2
(45) Date of Patent: Jun. 30, 2020

(54) METHOD AND SYSTEM FOR OPTIMIZING THE OPERATION OF AT LEAST ONE OF A PLURALITY OF FIELD DEVICES FROM AUTOMATION TECHNOLOGY

(71) Applicant: Endress+Hauser Process Solutions AG, Reinach (CH)

(72) Inventors: Marc Baret, Kembs (FR); Georg Hauss, Freiburg (DE); Ulrich Kaiser, Basel (CH); Michael Maneval, Schopfheim (DE); Markus Nick, Kembs (FR)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 15/780,197

(22) PCT Filed: Nov. 11, 2016

(86) PCT No.: PCT/EP2016/077389
§ 371 (c)(1),
(2) Date: May 30, 2018

(87) PCT Pub. No.: WO2017/093001
PCT Pub. Date: Jun. 8, 2017

(65) Prior Publication Data
US 2018/0356801 A1 Dec. 13, 2018

(30) Foreign Application Priority Data

Nov. 30, 2015 (DE) ........................ 10 2015 120 734

(51) Int. Cl.
*G05B 19/00* (2006.01)
*G05B 19/418* (2006.01)
*G05B 19/042* (2006.01)

(52) U.S. Cl.
CPC ... *G05B 19/41845* (2013.01); *G05B 19/0426* (2013.01); *G05B 2219/25428* (2013.01); *G05B 2219/33331* (2013.01)

(58) Field of Classification Search
CPC .......... G05B 19/41845; G05B 19/0426; G05B 2219/25428; G05B 2219/33331
See application file for complete search history.

(56) References Cited

U.S. PATENT DOCUMENTS

| | | | |
|---|---|---|---|
| 6,285,966 B1* | 9/2001 | Brown ............... | G05B 19/0425 702/182 |
| 2003/0004765 A1* | 1/2003 | Wiegand ................ | G06Q 10/06 702/184 |

(Continued)

FOREIGN PATENT DOCUMENTS

| | | | | |
|---|---|---|---|---|
| CN | 101460910 | * | 6/2009 | ............... G06F 3/00 |
| DE | 102005058801 A1 | | 6/2007 | |

(Continued)

OTHER PUBLICATIONS

Kastner, W., Neugschwandtner, G., Soucek, S., & Newman, H. M. (Jun. 2005). Communication systems for building automation and control, Proceedings of the IEEE, 93(6), 1178-1203 (Year: 2005).*

(Continued)

*Primary Examiner* — Michael D Masinick
(74) *Attorney, Agent, or Firm* — Mark A. Logan; PatServe

(57) ABSTRACT

The invention relates to a method and to a system for optimizing the operation of a plurality of field devices in an automation technology plant. The method comprises: ascertaining application information and device types of field devices, wherein the application information describes the application of the respective field device; classifying the application information and storing the classified application information; ascertaining parameter sets from each of the (Continued)

plurality of field devices, wherein the parameter sets comprise multiple parameters and each parameter is assigned a parameter value or a parameter value range, and each field device has at least one current parameter set and at least one standard parameter set, and storing the parameter sets; comparing the current parameter sets with the standard parameter sets to determine actually used parameters of a device type for an application; and operating the field device on the basis of the actually used parameters.

6 Claims, 1 Drawing Sheet

(56) References Cited

U.S. PATENT DOCUMENTS

| | | | | |
|---|---|---|---|---|
| 2003/0150908 | A1* | 8/2003 | Pokorny | B23Q 35/12 235/375 |
| 2006/0195726 | A1* | 8/2006 | Ishizuka | G01R 31/31917 714/38.1 |
| 2007/0078540 | A1* | 4/2007 | Bump | G05B 19/41845 700/90 |
| 2007/0244584 | A1* | 10/2007 | John | G05B 19/0421 700/86 |
| 2007/0250180 | A1* | 10/2007 | Bump | G05B 19/41845 700/1 |
| 2007/0255520 | A1* | 11/2007 | Becker | G05B 19/042 702/127 |
| 2008/0303472 | A1* | 12/2008 | John | G05B 19/0426 318/568.2 |
| 2009/0276486 | A1* | 11/2009 | Tandon | G05B 19/4185 709/203 |
| 2011/0125342 | A1* | 5/2011 | Lang | H02J 13/0062 700/297 |
| 2011/0270423 | A1* | 11/2011 | Maier | G05B 19/042 700/87 |
| 2012/0035746 | A1* | 2/2012 | Broom | G06Q 10/087 700/21 |
| 2012/0235479 | A1* | 9/2012 | Seiler | G05B 19/042 700/11 |
| 2013/0173025 | A1* | 7/2013 | Hahniche | G05B 19/042 700/11 |
| 2013/0211547 | A1* | 8/2013 | Buchdunger | G05B 19/0426 700/11 |
| 2014/0364970 | A1* | 12/2014 | Goli | G06F 8/30 700/87 |
| 2015/0012141 | A1* | 1/2015 | Schulz | G05B 11/01 700/275 |
| 2015/0105871 | A1* | 4/2015 | Ochsenreither | G05B 19/0426 700/29 |
| 2015/0106826 | A1* | 4/2015 | Hahniche | H04L 41/0253 719/321 |
| 2016/0299482 | A1* | 10/2016 | Sun | G05B 19/048 |
| 2016/0364973 | A1* | 12/2016 | Jammikunta | G01D 18/002 |

FOREIGN PATENT DOCUMENTS

| | | | | |
|---|---|---|---|---|
| DE | 102007026678 | * | 12/2008 | G05B 19/04 |
| DE | 102007063312 A1 | | 7/2009 | |
| DE | 102009000052 | * | 7/2010 | G05B 19/04 |
| DE | 102010026494 A1 | | 1/2012 | |
| DE | 102010062661 | * | 6/2012 | H04L 12/24 |
| DE | 102013218971 A1 | | 3/2015 | |
| JP | 2007124206 | * | 5/2007 | G05B 23/02 |
| WO | 2006069762 A1 | | 7/2006 | |
| WO | WO2007121218 | * | 10/2007 | G05B 15/00 |
| WO | 2009049656 A1 | | 4/2009 | |
| WO | WO2009083422 | * | 7/2009 | G05B 19/042 |

OTHER PUBLICATIONS

Search Report for German Patent Application No. 10 2015 120 734.6, German Patent Office, dated Aug. 1, 2016, 8 pp.
Search Report for International Patent Application No. PCT/EP2016/077389, WIPO, dated Jan. 30, 2017, 11 pp.

* cited by examiner

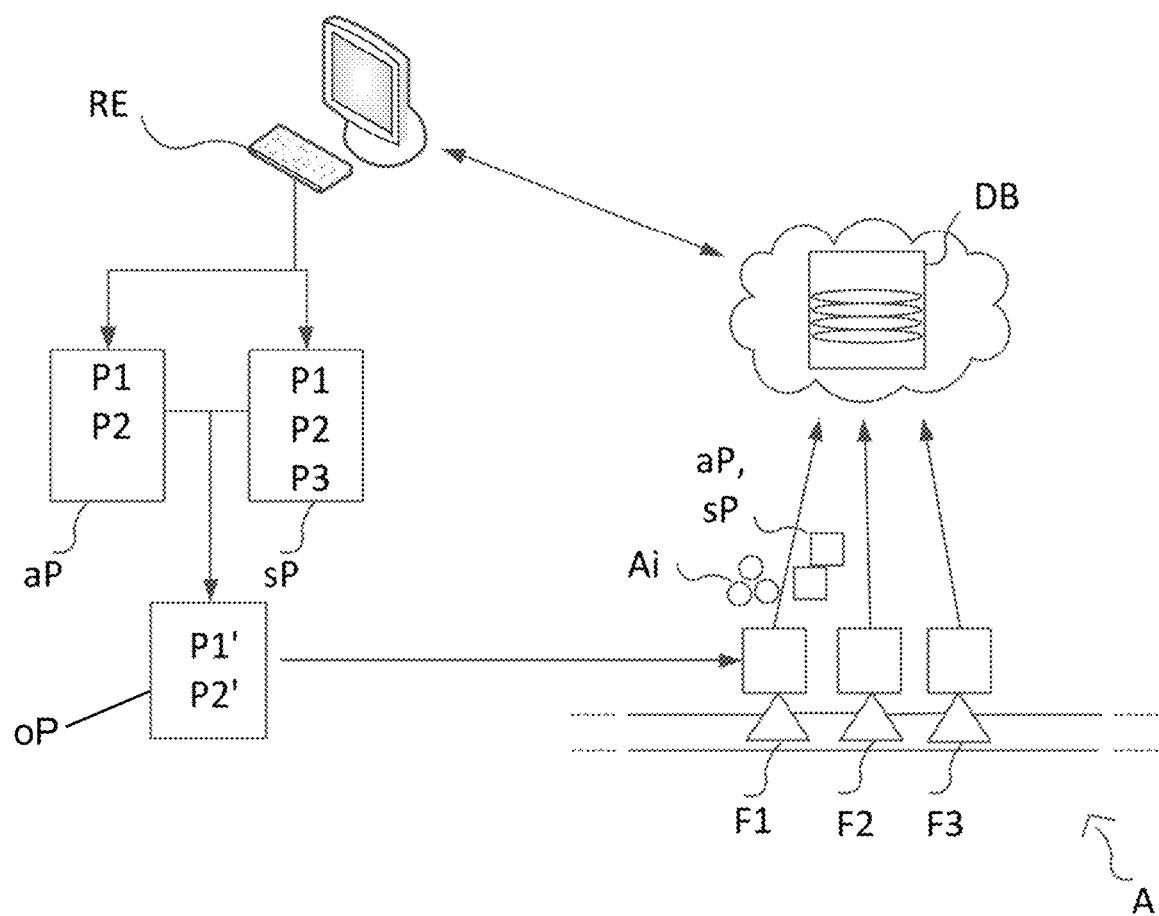

METHOD AND SYSTEM FOR OPTIMIZING THE OPERATION OF AT LEAST ONE OF A PLURALITY OF FIELD DEVICES FROM AUTOMATION TECHNOLOGY

CROSS-REFERENCE TO RELATED APPLICATIONS

The present application is related to and claims the priority benefit of German Patent Application No. 10 2015 120 734.6, filed on Nov. 30, 2015 and International Patent Application No. PCT/EP2016/077389 filed on Nov. 11, 2016, the entire contents of which are incorporated herein by reference.

TECHNICAL FIELD

The invention relates to a method and to a system for optimizing the operation of at least one of a plurality of field devices in an automation technology plant, which field devices are used in different applications.

BACKGROUND

Field devices that are used in industrial installations are already known from the prior art. In automation technology—in particular, in process automation and in manufacturing automation technology—field devices are used frequently. In principle, the term, "field device," refers to all devices that are process-oriented and that process or supply process-relevant information. Field devices are thus used for detecting and/or influencing process variables. Measuring devices, or sensors, are used for detecting process variables. These measuring devices are used, for example, for pressure and temperature measurement, conductivity measurement, pH measurement, flow measurement, fill-level measurement, etc., and detect the corresponding process variables of pressure, temperature, conductivity, pH value, fill-level, flow, etc. Actuators are used to influence process variables. These actuators are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices is produced and marketed by the Endress+Hauser group.

Field devices that are integrated into a new application of a process plant or replacement field devices that replace an obsolete or defective field device of an application must be adapted specifically to the respective application. To this end, these field devices are configured and parameterized during or after manufacturing. The configuration describes, on the one hand, the configuration on the hardware side, e.g., the flange material of a flow measuring device, as well as the configuration on the software side. The term, "parameterization," is understood to mean the defining and specifying of parameters, with the aid of which the operation of the field device is set to the respective features of the application—for example, the measured medium.

From the factory, all field devices of the same device type and/or of the same configuration have the same number of parameters and the same preset standard parameter set. The specific adaptation of individual parameters is extremely complex and associated with a high manual effort as a result of the sometimes high number of parameters—often up to several hundred different parameters. For the customer, a specific adaptation of the parameters is therefore frequently not practicable.

Many parameters are, moreover, dependent upon each other, so that a single parameter change by an inexperienced customer can sometimes result in a functional impairment of the field device.

SUMMARY

The invention is thus based upon the aim of providing a method and a system for facilitating the parameterization and/or change of parameter values of a field device for the customer.

The invention is realized by a method for optimizing the operation of at least one of a plurality of field devices in an automation technology plant, which field devices are used in different applications, the method comprising at least the following steps:

Collecting application information and device types of the plurality of field devices, wherein the application information describes each of the plurality of field devices unambiguously with respect to its application;

Classifying the application information of the plurality of field devices and saving the classified application information;

Collecting parameter sets of each of the plurality of field devices, wherein the parameter sets consist of several parameters, and each parameter is assigned a parameter value or a parameter value range, and each field device has at least one current parameter set and at least one standard parameter set, and saving the parameter sets;

Comparing the current parameter sets to the standard parameter sets in order to determine actually-used parameters of a device type for an application; and Operating the field device on the basis of the actually-used parameters.

The method according to the invention allows for a drastic reduction in the total number of parameters for a field device. For the customer, the parameterization and/or change to the parameter values of the field device is thereby facilitated.

Field devices that are described in connection with the invention are described by way of example in the introductory part of the present application.

The term, "application," refers to an application within the plant or within a process point of the plant, such as a flow measurement of a medium.

An advantageous embodiment of the system according to the invention provides that the actually-used parameters be optimized manually. This allows for a user-specific adaptation of the individual parameters.

A particularly advantageous embodiment of the system according to the invention provides that, for later use, comments regarding individual parameters of the actually-used parameters be created and stored as notes during optimization of the actually-used parameters. This allows for building up a store of experience for all customers, or users, of a respective field device.

A preferred variant of the method according to the invention provides that, in the case that parameters contained in the current parameter sets are dependent upon each other, these parameters be limited to a base parameter, wherein the base parameter is added to the actually-used parameters. This further reduces the plurality of parameters.

The invention is, moreover, realized by a system for optimizing the operation of a plurality of automation technology field devices, which system is suitable for implementing the method according to the invention and at least comprises:
- a database for saving application information and device types of a plurality of field devices and for saving parameter sets of the plurality of field devices;
- an electronic computation unit that accesses the remotely-arranged database and classifies, assigns, compares, and/or processes the data saved there; and
- software for supporting a user in parameterizing one of the plurality of field devices.

An advantageous embodiment of the system according to the invention provides that the application information consist of configuration, measuring method, and/or measuring task data of a field device. Generally speaking, application information constitutes information that sufficiently describes a field device with respect to its application.

In a particularly advantageous variant of the system according to the invention, the remotely-arranged database and/or the computation unit can be reached by means of cloud-computing web services. Cloud computing in this case describes the saving of data in a remote computing center—in this case, in a remote database. The advantage consists in a centralization of the stored data taking place, since each field device saves its data in the form of device types and diagnostic messages in this database.

An advantageous development of the system according to the invention provides that tracking of the parameter history of the plurality of field devices over time be implemented in the software.

A particularly preferred embodiment of the system according to the invention provides that the software be implemented on the computation unit, on a computer of the user, and/or on each of the plurality of field devices. The software accesses the database via one or more networks to which the computation unit, the computer of the user, and/or each of the plurality of field devices are connected. In principle, any customary protocol of a WAN or LAN network can be used for this purpose. However, an automation technology fieldbus network, such as Foundation Fieldbus®, Profibus®, HART®, Modbus®, etc., can also be used, which, for example, is connected to the internet via a gateway. The software can also be located as application software on a mobile end device, such as a smartphone or a tablet.

BRIEF DESCRIPTION OF THE DRAWING

The invention is explained in greater detail with reference to the following FIGURE. Illustrated is:

FIG. 1 shows an embodiment of the method according to the invention for operating at least one of a plurality of field devices in an automation technology plant.

DETAILED DESCRIPTION

FIG. 1 shows an embodiment of the method according to the invention for operating at least one of a plurality of field devices F1, F2, F3 in an automation technology plant A.

The field devices F1, F2, F3 are located in the same plant A and are used in the same application or in applications differing from each other. For example, field device F1 and field device F3 are, in this case, flow meters in accordance with the ultrasonic principle, and field device F2 is, in this case, a temperature sensor.

Application information Ai and the respective device type are collected from each of the field devices F1, F2, F3. The application information Ai consists, in particular, of configuration, measuring method, and/or measuring task data of a field device, such as the type of medium or the flange size of a measuring tube in the case of a flow-measuring device. Generally speaking, application information Ai constitutes information that sufficiently describes a field device F1, F2, F3 with respect to its application. The application information Ai is sent directly by the respective field devices F1, F2, F3 to a database DB, and saved there by the database DB. Alternatively, part of the application information Ai or even all of the application information Ai can also be entered manually into the database DB—for example, by a technician who commissions a field device F1, F2, F3 on-site. Another alternative is software, e.g., parameterization software, that reads the application data Ai of the field devices F1, F2, F3 and sends them to the database DB.

The remotely-arranged database DB is a database DB that can be reached by means of cloud-computing web services. Cloud computing in this case describes the saving of data in a remote computing center—in this case, in a remote database DB. The advantage consists in a centralization of the stored data taking place, since each field device F1, F2, F3 saves its data in the form of application information Ai in this database.

The application information Ai is sent to the database DB via one or more networks to which each of the plurality of field devices is connected. In principle, any customary protocol of a WAN or LAN network can be used for this purpose. However, an automation technology fieldbus network, such as Foundation Fieldbus®, Profibus®, HART®, Modbus®, etc., can also be used, which is, for example, connected to the internet via a gateway.

The application information Ai saved in the database DB is subsequently classified by a computation unit RE. A user can access the computation unit RE via cloud computing in the same way as the database DB. The access takes place, for example, by means of an internet-enabled computer or a mobile end device, such as a tablet PC or a smartphone.

The internet-enabled computer of the user, or his mobile end device, can, alternatively, assume the role of the computation unit RE, access the database DB, and assume tasks assigned to the computation unit RE.

Subsequently, parameter sets aP, sP are collected by the field devices F1, F2, F3. In this case, these parameter sets aP, sP can also be sent to the database DB by the respective field devices F1, F2, F3 themselves, or be entered manually into the database DB. As another alternative, in this step, software, e.g., parameterization software, can also read the parameter sets aP, sP of the field devices F1, F2, F3 and send them to the database DB. Parameter sets aP, sP contain at least one parameter P1, P2, P3, and a parameter value or a parameter value range is assigned to each parameter P1, P2, P3. The parameter sets aP, sP are, on the one hand, the current parameter sets aP, with which the respective field device F1, F2, F3 is operated, and, on the other, the standard parameter sets sP set at the factory and still saved on the respective field device F1, F2, F3. The computation unit RE assigns the parameter sets aP, sP to the respective application information Ai saved in the database DB, and saves them in the database DB.

The field devices F1, F2, F3 sometimes have a very large number of different parameters P1, P2, P3. In practice, only a fraction of the parameters P1, P2, P3 is sometimes needed by a customer in an application.

In order to be able to determine this fraction of the parameters P1, P2, P3—hereinafter called actually-used parameters—of a field device F1, the current parameter set aP of a respective field device F1, F2, F3 is compared to the respective standard parameter set sP. For example, the parameters P1, P2, P3 are defined in the parameter set sP set at the factory. In the current parameter set aP, only the parameters P1, P2 were occupied, compared to the standard parameter set sP; for parameter P3, the value of the standard parameter set sP is assigned.

The actually-used parameters in this example are thus P1 and P2; they will henceforth be called actually-used parameters P1', P2'. These parameters P1', P2' are saved in an optimal parameter set oP. The optimal parameter set oP subsequently replaces the current parameter set aP of the field device F1. This allows for significantly facilitating the parameterization of a field device for a customer by reducing the plurality of available parameters P1, P2, P3 to the actually-used parameters P1', P2'.

If one or more parameters P1, P2, P3 dependent upon a determined actually-used parameter P1', P2' exist, these parameters P1, P2, P3 can be limited to a base parameter, wherein the base parameter is added to the actually-used parameters P1', P2'.

The parameterization of the field device F1, F2, F3 takes place via software. In this respect, the software can be located on the computation unit RE, on a device of the customer, such as a computer or a mobile end device, such as a tablet or smartphone, or directly on each of the plurality of field devices F1, F2, F3.

It goes without saying that the method can be applied to any type and number of field devices F1, F2, F3 and is not limited to the examples of field devices F1, F2, F3 and their parameters P1, P2, P3 used in this embodiment.

LIST OF REFERENCE SYMBOLS

A Plant
Ai Application information
aP Current parameter set
DB Database
F1, F2, F3 Field devices
P1, P2, P3 Parameters
P1', P2' Actually-used parameters
RE Computation unit
sP Standard parameter set

The invention claimed is:

1. A method for optimizing the operation of at least one of a plurality of field devices in an automation technology plant, comprising:
  collecting application information and device types of the plurality of field devices, wherein the application information includes a measuring method and a measuring task of each of the plurality of field devices and describes each of the plurality of field devices unambiguously with respect to its application;
  saving the application information and the device types in a database;
  collecting from the plurality of field devices standard parameter sets and saving the standard parameter sets in the database, wherein the standard parameter sets include several parameters, each parameter of the standard parameter sets having a parameter identifier and a parameter value or a parameter value range;
  collecting from the plurality of field devices current parameter sets and saving the current parameter sets in the database, wherein the current parameter sets include several parameters, each parameter of the current parameter sets having a parameter identifier and a parameter value or a parameter value range, wherein the current parameter sets are subsets of the standard parameter sets;
  comparing the current parameter sets to the standard parameter sets to determine actually-used parameters of a device type for an application;
  saving the actually-used parameters in an optimal parameter set, and saving the optimal parameter set in the database;
  replacing the current parameter set on the at least one field device with the optimal parameter set; and
  operating the at least one field device on the basis of the actually-used parameters in the optimal parameter set.

2. The method according to claim 1, further comprising: manually optimizing the actually-used parameters.

3. The method according to claim 2, further comprising: storing in the database comments regarding individual parameters of the actually-used parameters.

4. A system for optimizing the operation of at least one of a plurality of field devices in an automation technology plant, comprising:
  a database having a data structure configured to save:
    application information of the plurality of field devices, wherein the application information includes a measuring method and a measuring task of each of the plurality of field devices;
    device types of the plurality of field devices;
    standard parameter sets of the plurality of field devices, wherein the standard parameter sets include parameter identifiers and parameter values for each parameter stored in the plurality of field devices during production of the plurality of field devices, and
    current parameter wets of the plurality of field devices, wherein the current parameter sets are subsets of the standard parameter sets, wherein the current parameter sets include the parameter identifiers and the parameter values for each parameter used by the plurality of field devices,
  wherein the database is remotely arranged from the plurality of field devices;
  a network, wherein the database is connected with the network;
  an electronic computation unit connected with the network and connected with the database via the network, wherein the electronic computation unit is configured to execute parameterization software; and
  parameterization software, wherein the parameterization software is executed by the electronic computation unit, and wherein the parameterization software is configured to:
    read application information from the plurality of field devices and store the application information in the database, wherein the application information includes measuring methods and measuring tasks of the plurality of field devices;
    read the device types from the plurality of field devices and store the device types in the database;
    read the current parameter sets from the plurality of field devices and store the current parameter sets in the database, wherein the current parameter sets are associated with the application information of the plurality of field device in the database;
    read the standard parameter sets from the plurality of field devices and store the standard parameter sets in the database, wherein the standard parameter sets are associated with the application information of the plurality of field devices in the database;

compare the standard parameter sets with the current parameter sets to produce an optimal parameter set; and store the optimal parameter set on the at least one field device.

5. The system according to claim 4, wherein the remotely arranged database and/or the computation unit can be reached via cloud-computing web services.

6. The system according to claim 4, wherein the parameterization software is further configured to track a parameter history of the plurality of field devices over time.

* * * * *